(12) United States Patent
Kilpi et al.

(10) Patent No.: US 7,522,945 B2
(45) Date of Patent: Apr. 21, 2009

(54) PORTABLE ELECTRONIC DEVICE (75) Inventors: Pekka Kilpi, Helsinki (FI); Sami Myyryläinen, Espoo (FI); Jussi Hakunti, Turku (FI); Tomas Ivaskevicius, Helsinki (FI)

(73) Assignee: Nokia Corporation, Espoo (FI)

( * ) Notice: Subject to any disclaimer, the term of this patent is extended or adjusted under 35 U.S.C. 154(b) by 390 days.

(21) Appl. No.: 11/170,749

(22) Filed: Jun. 28, 2005

(65) Prior Publication Data

US 2006/0293094 A1 Dec. 28, 2006

(51) Int. Cl.
*H04M 1/00* (2006.01)
(52) U.S. Cl. ............... 455/575.1; 455/575.3; 455/575.4
(58) Field of Classification Search ............. 455/575.1, 455/575.3, 575.4
See application file for complete search history.

(56) References Cited

U.S. PATENT DOCUMENTS 6,493,542 B1 * 12/2002 Frohlund .................. 455/90.1
6,542,721 B2 * 4/2003 Boesen ..................... 455/553.1
7,181,257 B2 * 2/2007 Gordecki ................... 455/575.4
2005/0124394 A1 * 6/2005 Kim et al. ................. 455/575.3

FOREIGN PATENT DOCUMENTS

EP 0766166 4/1997
EP 1312999 5/2003

* cited by examiner

*Primary Examiner*—Charles Appiah
*Assistant Examiner*—Nghi H Ly
(74) *Attorney, Agent, or Firm*—Alfred A. Fressola; Ware, Fressola, Van Der Sluys & Adolphson LLP (57) ABSTRACT A portable electronic device comprising a first panel supporting a user-operable input device on a first face and a second panel mounted for slidable movement over the first face of the first panel between a first position in which the user-operable input device is concealed and a second position in which the user-operable input device is exposed and, when the second panel is in the second position, for pivotal movement towards the face of the first panel.

28 Claims, 7 Drawing Sheets

PORTABLE ELECTRONIC DEVICE

FIELD OF THE INVENTION

The present invention relates to a portable electronic device, particularly, but not exclusively, to a mobile communications device.

BACKGROUND ART

Some forms of conventional portable electronic devices, particularly mobile communication devices, have either an extendible or foldable two-part construction which allows the device to be extended or folded open for use, then closed again for storage. These types of construction help to maximize the surface area available for supporting a keypad and a display, while minimizing the size of the device when closed.

The present invention seeks to provide a portable electronic device.

SUMMARY OF THE INVENTION

According to the present invention there is provided a portable electronic device comprising a first housing portion supporting a user-operable input device on a first face, a second housing portion and a third housing portion, the third housing portion being hingedly coupled to the first housing portion and the second housing portion being slidably coupled to the third housing portion, the second housing portion configured for slidable movement over the first face of the first housing portion between a first position in which the user-operable input device is concealed and a second position in which the user-operable input device is exposed and, when the second housing portion is in the second position, for pivotal movement towards the first face of the first housing portion to a third position.

The second housing portion may substantially cover the first face of the first housing portion when in the first position. The user-operable input device may substantially cover the first face of the first housing portion. The user-operable input device may comprise a keypad. The second housing portion may support a display device on a face relatively far from the first housing portion when the second housing portion is in the first position. Thus, the display device can be tilted towards the user-operable input device so that when a user operates the input device, they can view the display device more comfortably. The display device may substantially cover the far face of the second housing portion. Thus, the area of the display device can be increased to make viewing easier and/or to permit a greater number of items to be displayed. The display device may be a touch screen. Thus, the user can control the device even when the input device is not accessible. The first and second housing portion may be elongate and the second housing portion may be configured for longitudinal linear movement over the first housing portion such that a first end of the second housing portion is slidable from a first end of the first housing portion towards a second end of the first housing portion.

The third housing portion may be disposed outside the first housing portion. The third housing portion may have a body portion having a face. The face of the body portion may support an image capture device. The third housing portion may comprise a pair of arm members disposed either side of the body portion, the arm members extending towards and either side of the first housing portion, each arm member at their distal ends on inwardly facing sides being pivotally attached to respective outwardly facing sides of the first housing portion proximately to one end of the first housing portion for tilting the third housing portion towards the first face of the first housing portion. The third housing portion may comprise a pair of linear bearings for guiding slidable movement of the second housing portion between the arm members, each linear bearing comprising first and second bearing portions, wherein inwardly facing sides of the arm members provide first linear bearing portions and outwardly facing sides of the second housing portion provide second linear bearing portions.

The first housing portion may have first and second ends and the second housing portion has first and second ends such that a first end of the second housing portion is slidable from the first end of the first housing portion towards the second end of the first housing portion, wherein an axis about which the second housing portion pivots is proximate to the second end of the first housing portion, and wherein, when the second housing portion is in the first position, the first end of the second housing portion is located proximate to the first end of the first housing portion and, when the second housing portion is in the second position, the first end of the second housing portion is located such that, when the second housing portion is tilted, the first end of the second housing portion clears the second end of the first housing portion. The first and second housing portions may be panels.

The device may comprise a first biasing mechanism for biasing the second housing portion from the first position to the second position. The biasing mechanism may include a buckling spring.

The device may comprise a second biasing mechanism for biasing the second housing portion to the third position. The second biasing mechanism may include a torsional spring.

The device may further comprise a processor responsive, when the second housing portion is in the first position, to operate in a first mode and, when the second housing portion is in the second position, to operate in a second, different mode.

The device may be operable as a mobile communications device and/or a handheld computing device.

According to the present invention there is further provided a housing for a portable electronic device comprising a first housing portion having a region for receiving a user-operable input device on a first face, a second housing portion and a third housing portion, the third housing portion being hingedly coupled to the first housing portion and the second housing portion being slidably coupled to the third housing portion, the second housing portion configured for slidable movement over the first face of the first housing portion between a first position in which the region for receiving the user-operable input device is concealed and a second position in which the region is exposed and, when the second housing portion is in the second position, for pivotal movement towards the first face of the first housing portion to a third position.

The third housing portion may be disposed outside the first housing portion.

According to the present invention there is still further provided a housing portion for a portable electronic device comprising hinge coupling means for co-operating with complementary hinge coupling means on a first housing portion for permitting the housing portion and the first housing portion to be hidgedly coupled and slide coupling means for co-operating with complementary slide coupling means on a second housing portion for permitting the housing portion and the second housing portion to be slidably coupled.

The housing portion may comprise a body portion and a pair of arm members depending from sides of the body portion, the arm members having the hinge coupling means disposed on inwardly facing sides of the arm members close to their distal ends and the slide coupling means disposed on the inwardly facing sides.

The hinge coupling means may comprise at least one pin and the slide coupling means comprises at least one projecting ridge.

BRIEF DESCRIPTION OF THE DRAWINGS

Embodiments of the present invention will now be described, by way of example, with reference to the accompanying drawings in which.

DETAILED DESCRIPTION OF THE INVENTION

Figure 1:
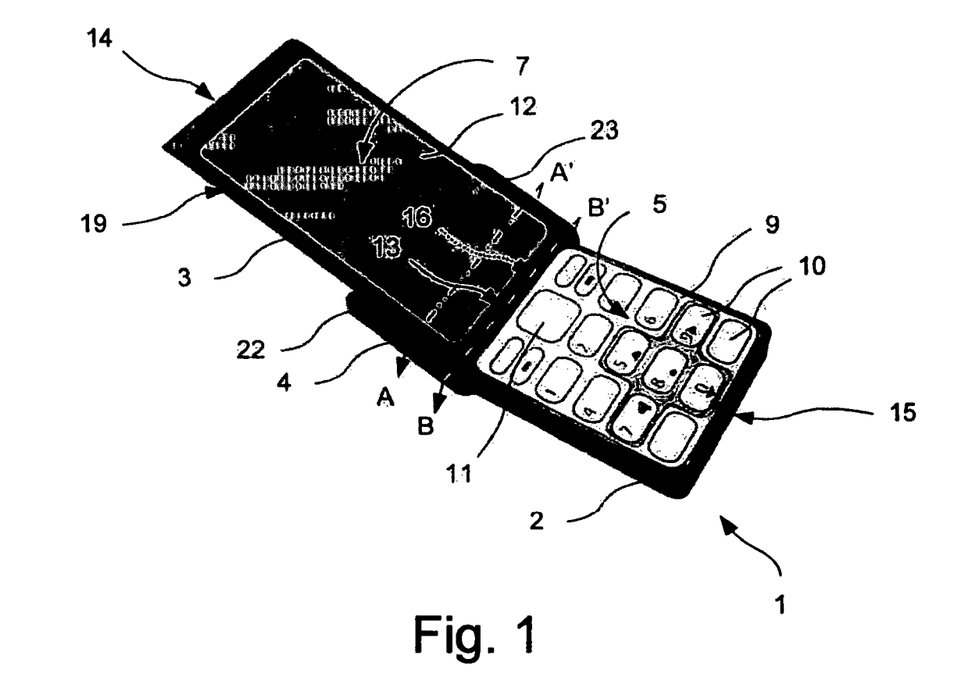
FIG. 1 is a perspective view of an embodiment of a portable electronic device according to the present invention.

Referring to FIG. 1, an embodiment of a portable electronic device 1 according to the present invention is shown. The device 1 is in the form of mobile communications device having a plurality of functions including, among others, mobile telephony and handheld computing. The device 1 may have additional and/or different functions. The device 1 may be in the form of another type of portable electronic device, such as a handheld computing device, a radio broadcast receiving device or a content rendering device, such as a digital versatile disk (DVD) player.

The device 1 has first and second housing portions 2, 3 and a third housing portion 4, hereinafter referred to as a carriage 4, for guiding slidable movement of the second housing portion 3 over a first face 5 of the first housing portion 2 between first and second positions and, when the second housing portion 3 is in the second position, for pivotal movement towards the first face of the first housing portion 2 to a third position. In FIG. 1, the first housing portion 3 is shown in the third position. Electronic circuitry 61 (FIG. 10) is housed within the first and second housing portions 2, 3 and the carriage 4.

The first and second housing portions 2, 3 are generally flat and are thin relative to their lengths and widths. Therefore, the housing portions 2, 3 are hereinafter referred to as panels 2, 3. The first and second housing portions 2, 3 need not be flat, for example they may be arcuate, and need not be thin.

When the device 1 is in use, the first face 5 is usually uppermost relative to a second, opposite face 6 (FIG. 4) of the first panel 2. Therefore, the first and second faces 5, 6 are hereinafter referred to as the upper and lower faces 5, 6 respectively. The second panel 3 has first and second opposite faces 7, 8 (FIG. 4) and are accordingly referred to as the upper and lower faces 7, 8 (FIG. 4) respectively.

The upper face 5 of the first panel 2 supports a user-operable input device 9. The input device 9 is in the form of a keypad having a plurality of keys 10 and a joystick key or device 11. However, other forms of input device 9 or other keypad configurations may be used. The keypad 9 substantially covers the upper face 5 of the first panel 2, although it need not do so. As will be explained in more detail later, in the first position, the second panel 3 substantially conceals the keypad 9 and the upper face 5 of the first panel 2.

The upper face 7 of the second panel 3 supports a display device 12. The display device 12 is in the form of display having display and input functionality, such as a touch screen. However, the display device 12 need not have input functionality. The touch screen 12 substantially covers the upper face 7 of the second panel 3.

The second panel 3 slides over the first panel 2 such that a first end 13 of two ends 13, 14 of the second panel 3 is slidable from a first end 15 of the first panel 2 towards a second end 16 of the first panel 2. In normal use, when a user holds the device 1, the first end 15 of the first panel 2 is closer to the user than the second end 16.

Figure 2:
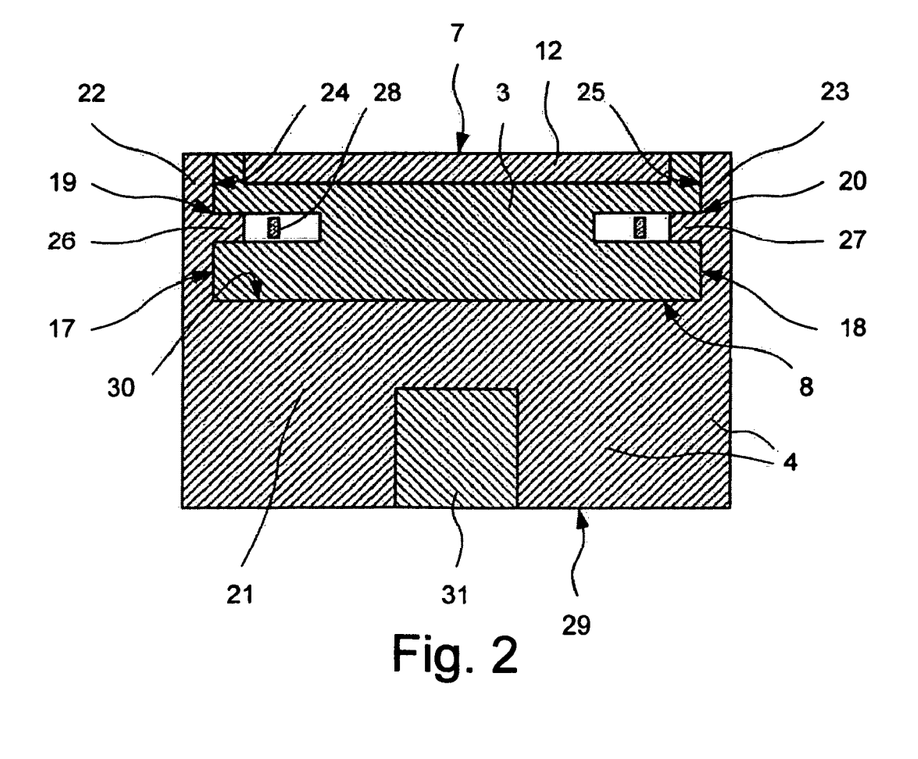
FIG. 2 is cross-sectional view of the device shown in FIG. 1 taken along the line A-A'.

Referring to FIG. 2, the second panel 3 has a pair of side faces 17, 18. Each side face 17, 18 includes a respective slot 19, 20. The slots 19, 20 are longitudinally orientated between the first and second ends 13, 14. The carriage 4 includes a body portion 21 having a pair of arm members 22, 23 upstanding from sides of the body portion 21. The body portion 21 and arm members 22, 23 cup the second panel 3. The arm members 22, 23 have facing sides 24, 25, each supporting a respective projecting ridge 26, 27, which may also be known as runners. The ridges 26, 27 engage the slots 19, 20 for allowing the second panel 3 to slide to-and-fro through the carriage 4 so providing a pair of linear bearings. Linear sliding movement may be modified. For example, the second panel 3 may also lift away from the upper face 5 of the first panel 2 as it slides.

The second panel 3 also includes a first biasing mechanism 28 for biasing the second panel 3 from a first position to a second position. The first biasing mechanism 28 is in the form of a buckling spring 28. However, the first biasing mechanism 28 may be omitted or may be in another form, such as an extendible spring.

The body portion 21 has first and second opposing faces 29, 30. The first face 29 is concealed by the second panel 3. In normal use, when the user holds the device 1, the second face 30 generally faces away from the user. The second face 30 supports an image capture device 31.

Figure 3:
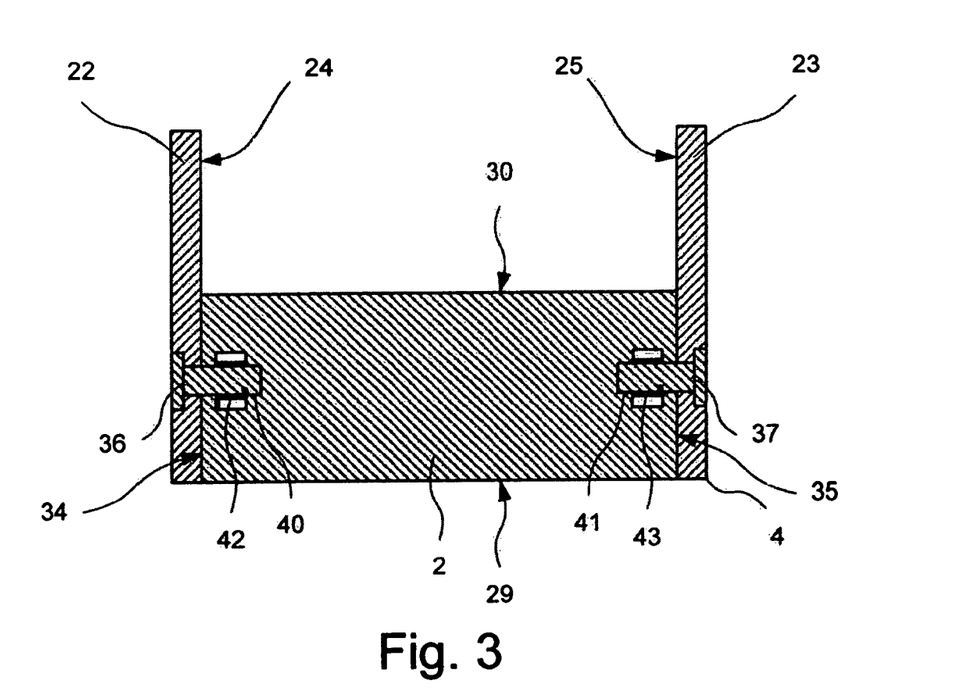
FIG. 3 is cross-sectional view of the device shown in FIG. 1 taken along the line B-B'.
Figure 4:
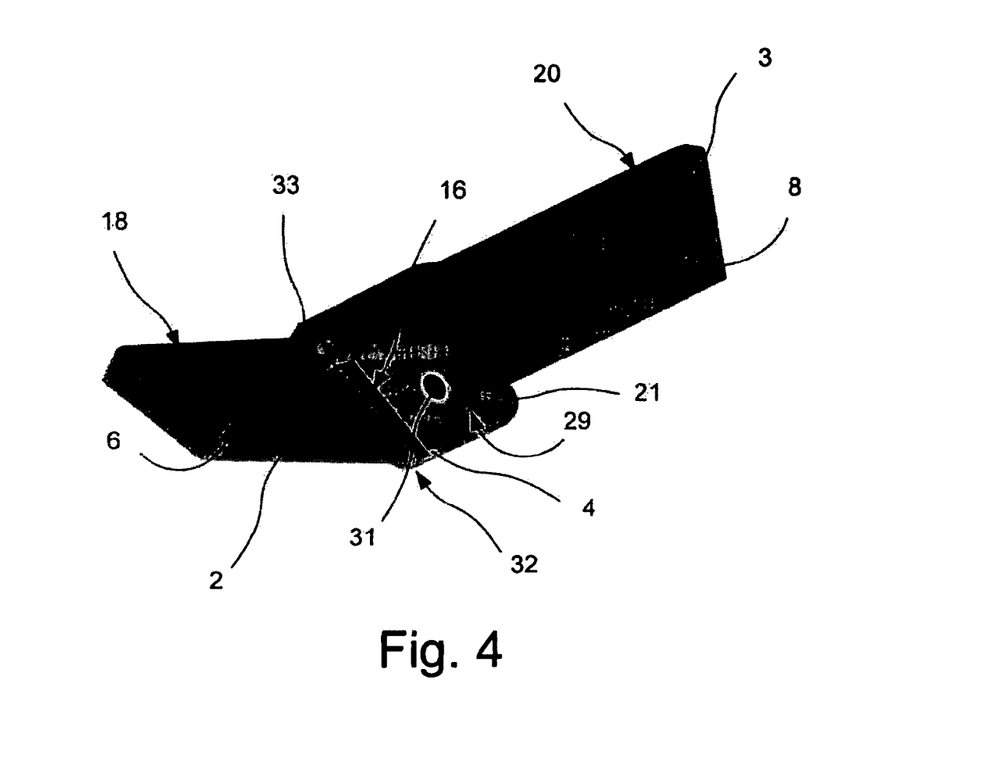
FIG. 4 is another perspective view of the device shown in FIG. 1.

Referring to FIGS. 3 and 4, the carriage 4 is hingedly coupled to the first panel 2 for tilting the second panel 3 towards the first panel 2. The arm members 22, 23 are parallel and depend or extend away from sides of the body portion 21 towards and either side of the first panel 2. Close to their distal ends 32, 33 (FIG. 4) on inwardly facing sides 24, 25, the arm members 22, 23 are pivotally attached to the first panel 2 through respective outwardly facing sides 34, 35 proximately to the second end 16 of the first panel 2 via pins 36, 37. The pins 36, 37 pass through holes 38, 39 in the arm members 22, 23 and into holes 38, 39 in the first panel 2. The pins 36, 37 are fixed to the arm members 22, 23 and are free to rotate in holes 40, 41. The carriage 4 may be hingedly coupled to the first panel 2 using other arrangements.

The first panel 2 also includes a second biasing mechanism 42, 43 for biasing the second panel 3 from a second position to a third position. The second biasing mechanism 42, 43 is in the form of a pair of torsional springs 42, 43. However, the second biasing mechanism 42, 43 may comprise a single torsional spring, may be omitted or may be in another form.

Figures 5, 5A:
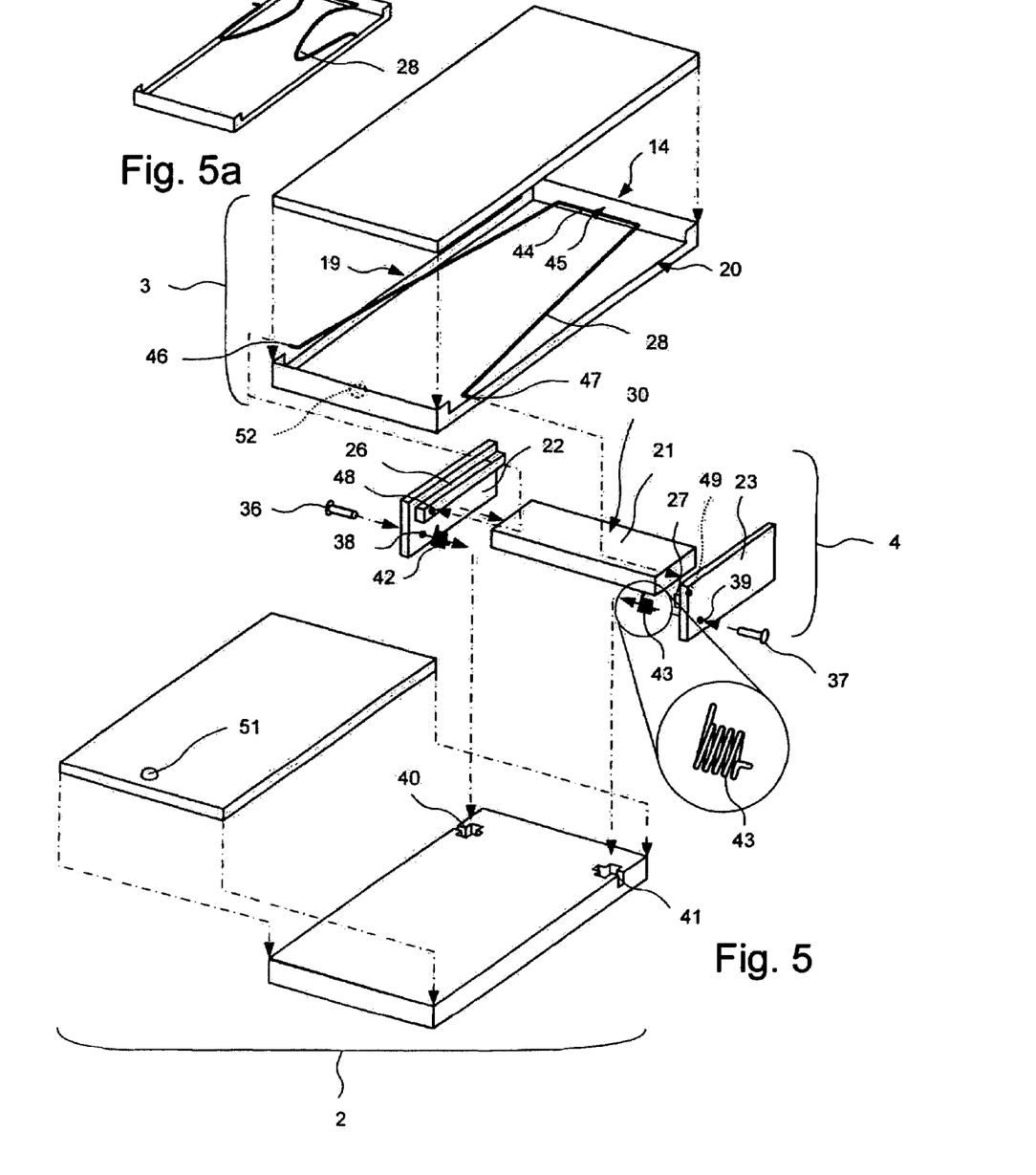
FIG. 5 is an exploded, perspective view of the device shown in FIG. 1 showing biasing mechanisms for biasing the cover panel between first and third positions.
FIG. 5a illustrates a biasing mechanism in a stressed position.

Referring to FIG. 5, the buckling spring 28 is in the form of an arched steel wire. A middle portion 44 of the spring 28 abuts an inner end surface 45 at the second end 14 of the second panel 3. Ends 46, 47 of the spring 28 pass through slots 19, 20 running along the edge of the second panel 3 and are anchored in respective holes 48, 49 in ridges 26, 27. Thus, the spring 28 flexes as the second panel 3 moves with respect to the carriage 4.

In FIG. 5, the buckling spring 28 is illustrated is in a relaxed state, i.e. not buckled, when the second panel 3 is in the second or third position.

FIG. 5a illustrates the buckling spring 28 in a stressed state, i.e. buckled, when the second panel 3 is in the first position. When stressed, the buckling string 28 applies a force to the second panel 3 in direction 50. This force is resisted by a catch 51, 52. The catch is in the form of a sprung-loaded ball 51 and socket 52. The ball 51 is disposed on the first panel 2 and is urged into a socket 52 in the second panel 3. The ball 51 and socket 52 resist shearing of the first panel 2 relative to the second panel 3. The resistance may be overcome by the user sliding the second panel 3 enough to disengage the ball 51 from the socket 52. Thereafter, the user need not provide additional force. Other forms of catches may be used.

Figure 6:
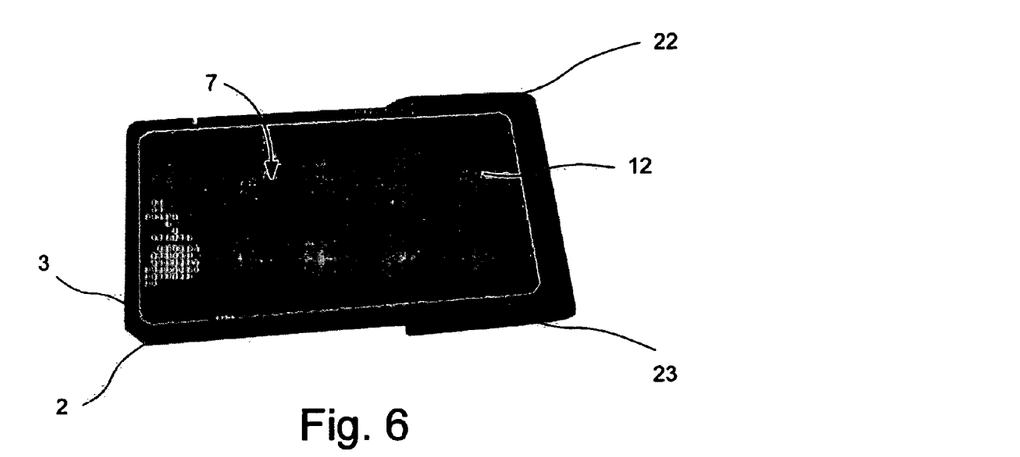
FIG. 6 is perspective view of the device shown in FIG. 1 with an upper panel in a first position.
Figure 7A:
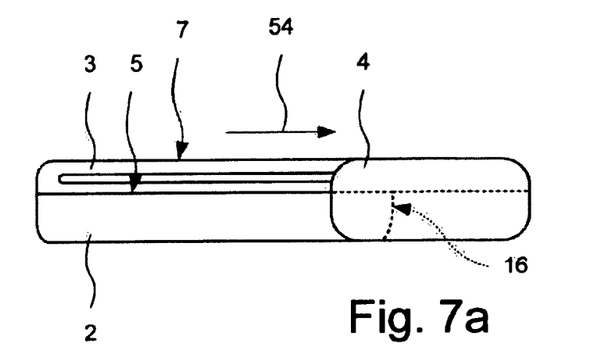
FIGS. 7a to 7c are side views of the device shown in FIG. 1 with a covering panel in first, second and third positions.

Referring to FIGS. 6 and 7a, the device 1 is shown with the second panel 3 in the first position with respect to the first panel 2. In this position, the second panel 3 substantially conceals the keypad 9 (FIG. 1) and the upper face 5 (FIG. 1) of the first panel 2.

When the second panel 3 is in the first position, the device 1 is in a relatively compact state for convenient storage, for example in a user's pocket. However, the user may still be able to use the device 1, for example by using the touch screen 12, to accesses a device function, for example a calendar.

The user may wish to extend the device 1 for more convenient access to the device function or to access another device function, such as telephony. Therefore, the user pushes the second panel 3 over the first panel 2 towards the second end 16 of the first panel 2. In FIG. 7a, this action is illustrated by arrow 54. As described in earlier, once the second panel 3 has been displaced by a given distance, the first biasing mechanism 28 (FIG. 5) is used to push the second panel 3 towards the second end 16 of the first panel 2 to the second position.

Figure 7B:
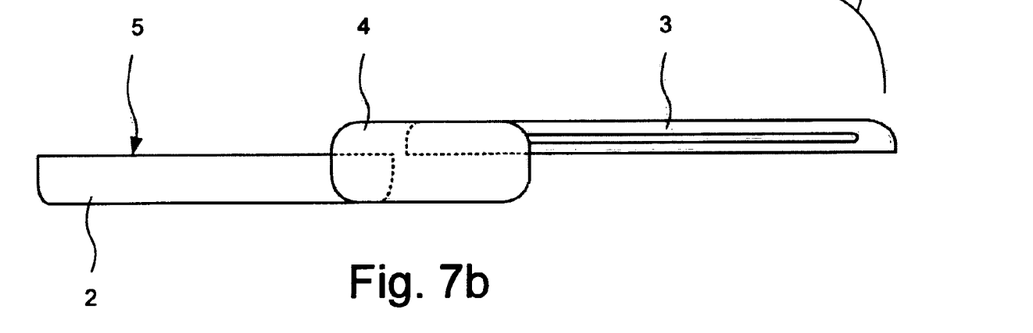

Referring to FIG. 7b, the device 1 is shown with the second panel 3 in the second position. In this position, the previously-concealed keypad 9 (FIG. 1) and upper face 5 of the first panel 2 are revealed.

The second panel 3 begins to tilt towards to the first face 5 of the first panel 2 to a third position. In FIG. 7b, this action is illustrated by arrow 55. The second biasing mechanism 42, 43 (FIG. 5) causes the upper face 7 of the second panel 3 to tilt towards the upper face 5 of the first panel 2 to a third position.

Figure 7C:
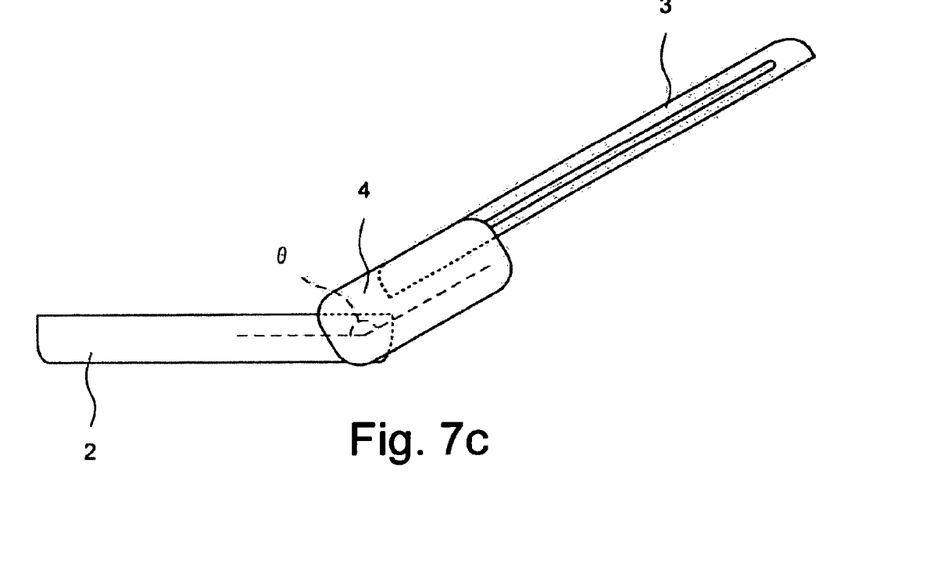

Referring to FIG. 7c, the device 1 is shown with the second panel 3 in the third position. In this position, the second panel 3 still substantially reveals the keypad 9 and the upper face 5 of the first panel 2. Additionally, the second panel 3 is tilted towards to the first face 5 of the first panel 2. For example, this may be to allow the user to view the touch screen 12 more easily and/or to allow a speaker 65 (FIG. 10) disposed on the upper face 5 of the first panel 2 close to the first end 15 and microphone 66 (FIG. 10) disposed on the upper face 7 of the second panel 3 close to the second end 14 to be positioned close to the user's ear and mouth respectively.

In the third position, the first and second panels 2, 3 may subtend an angle θ between 180 and 135 degrees.

The second panel 3 may be returned to the first position by reversing the steps. In doing so, the user acts against the biasing mechanisms 28, 42, 43.

Figure 8:
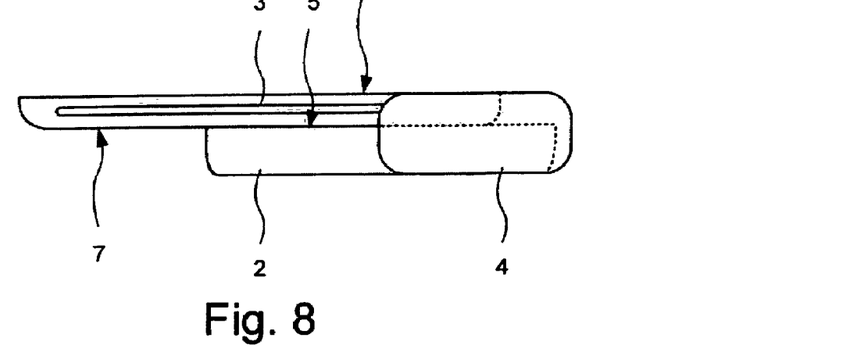
FIG. 8 is a side view of the device shown in FIG. 1 with a covering panel in a fourth position.

Referring also to FIG. 8, the device 1 may be modified so as to allow the user to fold the second panel 3 further from the third position to a fourth position so that the second panel 3 again covers the upper face 5 of the first panel 2. Thus, in the fourth position, the angle θ between the first and second panels 2, 3 is substantially 0 degrees. In this position, the upper face 7 of the second panel 3 faces the upper face 5 of the first panel 3. Thus, the display 12 (FIG. 1) can be protected.

The second biasing mechanism 42, 43 may be arranged to bias the second panel 3 from the third position to the fourth position. A positioning or holding mechanism (not shown) may also be provided so as to position the second panel 3 in the third position and thus prevent the panel 3 from automatically moving to the fourth position and/or allow the user to reliably position the second panel in the third position. The positioning mechanism (not shown) may implemented by providing longitudinal ridges or ribs (not shown) and corresponding notches or ribs (not shown) on the pins 36, 37 and holes 40, 41. When the second panel 2 is in the third position, the ridges (not shown) engage the notches (not shown) such that the second panel 3 stops tilting and thus holding the panel 3 in the third position. If the user wishes to close the device, they may tilt the second panel 3 further towards the fist panel 2. If this happens the ridges (not shown) are urged from the notches (not shown). The biasing mechanism 42, 43 may then continue to bias the second 3 panel to the fourth position.

Figure 8A:
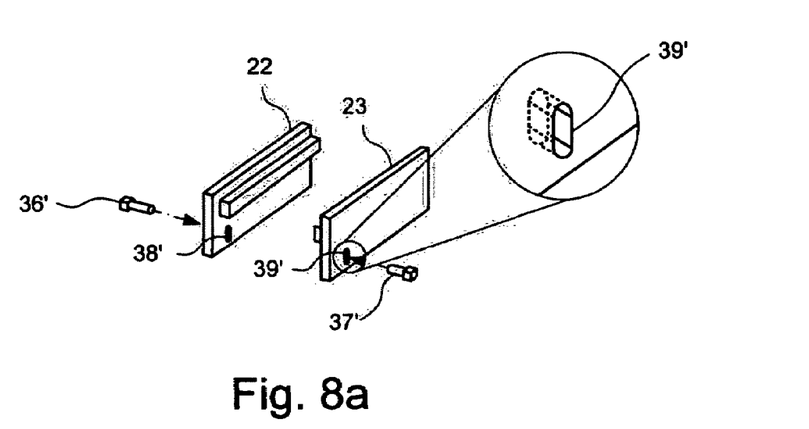
FIG. 8a illustrates a first modification which may help a covering panel to reach the fourth position shown in FIG. 8.

Referring also to FIG. 8a, to allow the upper face 7 of the second panel 3 to lie flat against the first panel 2, the device 1 can be modified to allow the carriage 4 to slidably move upwardly with respect to the first panel 2, for example, by replacing the circular holes 38, 39 in the arm members 22, 23 of the carriage 4 with vertical slots 38', 39' so as to allow pins 36', 37' to drop with respect to the rest of carriage 4. This permits the carriage 4 to rise with respect to the first panel 2. The pins 36', 37' have square heads which sit in the slots 38', 39' to prevent the pins 36', 37' from rotating in the slots 38', 39'. Thus, if the pins 36', 37' rotate, then the carriage 4 (FIG. 8) also rotates. Other arrangements to prevent rotation may be used.

Additionally or alternatively, to allow the carriage 4 to slidably move upwardly with respect to the first panel 2, holes 40, 41 (FIG. 5) in the first panel 2 may be extended upwardly towards the upper face 5 of the panel 2 to form elongate slots (not shown).

Other arrangements which allow the upper face 7 of the second panel 3 to lie flat against the first panel 2 may be used.

Figure 8B:
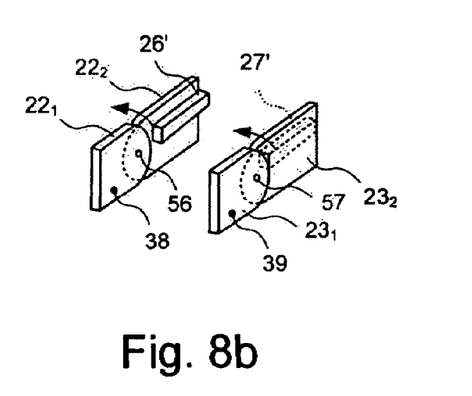
FIG. 8b illustrates a second modification which may help a covering panel to reach the fourth position FIG. 8.

Referring to FIG. 8b, the arm members 22, 23 (FIG. 5) of the carriage 4 may be replaced by pairs of lower and upper arm members $23_1$, $23_2$, $24_1$, $24_2$ which are pivotably connected by joints 56, 57. The ridges 26, 27 (FIG. 5) may be replaced with shorter ridges 26', 27' so that they fit onto the upper arm members $22_2$, $23_2$. Thus, when the lower arm $23_1$, $24_1$ which is attached to the first panel 2 (FIG. 8) can no longer pivot or is close to no longer being able to pivot, the upper arm $23_2$, $24_2$ which carries the second panel 2 (FIG. 8) can continue to rotate.

Figure 8C:
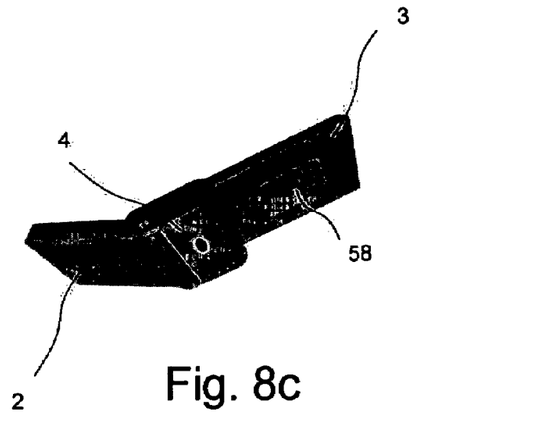
FIG. 8c illustrates a device with an additional display.

Referring to FIG. 8c, the device 1 may be modified such that an additional display 58 may be provided on the lower face 8 or the second panel 2. For example, the additional display 58 may be smaller, be monochromic and/or have lower resolution than the display 12 and need not be a touch screen. The additional display 58 can be used for displaying simple information such as a few digits and or characters, such as time or a telephone number (or associated name) of an incoming call.

In the examples hereinbefore described, the second panel 3 tilts towards upper face 5 of the first panel 2. However, the second panel 3 may also tilt the other way, towards the lower face 6 of the first panel 2.

Figure 9A:
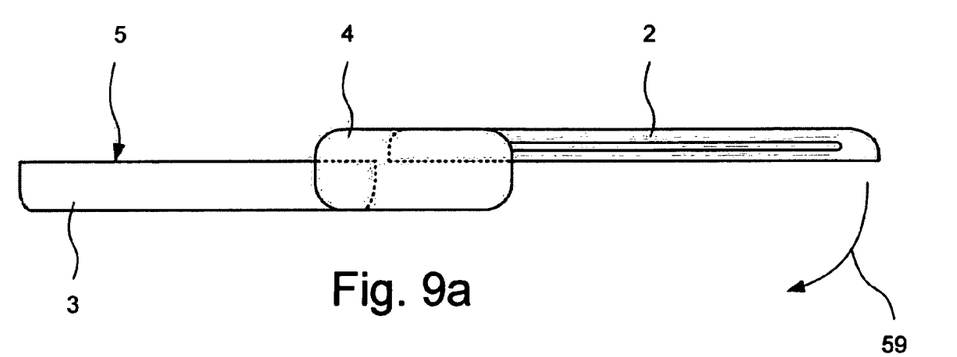
FIGS. 9a and 9b are side views of the device shown in FIG. 1 with a covering panel in second and fifth positions.

Referring to FIG. 9a, the device 1 is shown with the second panel 3 in the second position. The user may have already pushed the second panel 3 to the second position from the third position. The user may push the second panel 3 towards the second face 6 of the first panel 2 to a fifth position. In FIG. 9a, this action is illustrated by arrow 59.

Figure 9B:
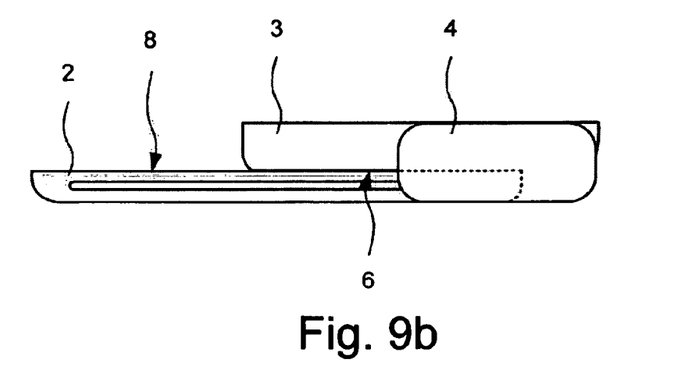

Referring to FIG. 9b, the device 1 is shown with the second panel 3 in the fifth position. In the fifth position, the lower faces 6, 8 of the panels 2, 3 face.

Figure 10:
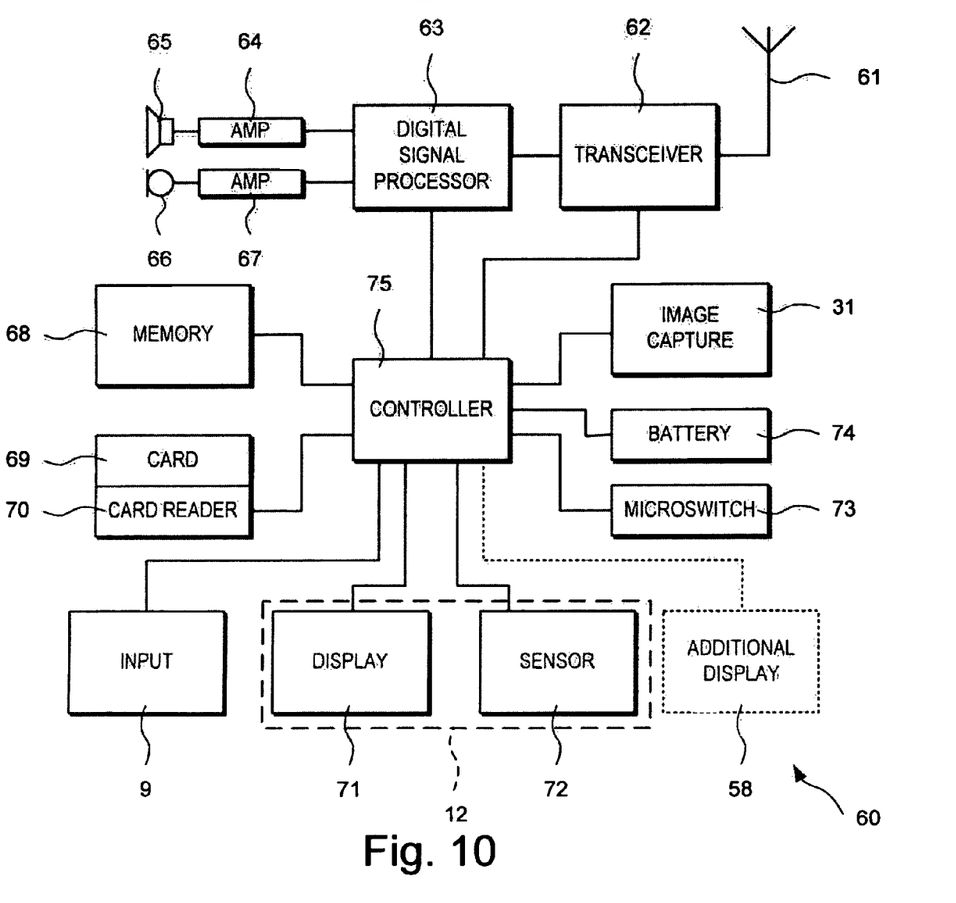
FIG. 10 is a schematic diagram of circuitry of the device shown in FIG. 1.

Referring to FIG. 10, the device 1 may communicate with a communications network (not shown) according to a second, (and/or) third, fourth or later generation mobile telephone standard.

The device 1 has circuitry 60 including an antenna 61, a transceiver 62, a digital signal processor (DSP) 63, an amplifier 64, a speaker 65, a microphone 66, an amplifier 67, memory 68, a smart card 69, for example in the form of a Global System for Mobile Communication (GSM) Subscriber Identity Module (SIM) card or 3 g Universal Subscriber Identity Module (USIM) card, a smart card reader 70, the user-operable input device 9, the display device 12 having for example an integrated thin film transistor (TFT) display 71 and sensor 72, a microswitch 73, a battery 68, the image capture device 31, a controller 74 and an optional additional display 58.

Electrical analog signals are produced by the microphone 66 and amplified using amplifier 67. Similarly, analog audio signals are fed to the speaker 65 through an amplifier 64. The controller 74 receives instructions from input device 9 and sensor 72 and controls operation of the TFT display 71. Information concerning the identity of the user is held on a smart card 69. The smart card 69 is removeably received in a smart card holder 70 connected to the controller 74.

Communication radio signals, to and from the communications network (not shown), are transmitted and received by the antenna 61 connected through the transceiver 62 to the DSP 63 for performing coding and decoding under the control of the controller 74.

When the device 1 is used as a mobile telephone handset, the DSP 63 receives analog signals from the microphone amplifier 67, digitizes them into a form suitable for transmission and feeds them to the transceiver 62 for transmission through the antenna 61 for transmission to the communications network (not shown). Similarly, signals received from the communications network (not shown) are fed through the antenna 61 to be demodulated by the transceiver 62 and fed to DSP 63 so as to produce analog signals which are fed though the amplifier 64 to speaker 65.

Referring also to FIGS. 7a, 7b and 7c, the microswitch 73 is provided in socket 52 (FIG. 5) to detect whether the ball 51 is pressed against it and, thus, whether the second panel 3 is in the first position. If the second panel 3 is not in the first position, then the controller 75 operates in a first mode running a first set of software applications, which may include image capturing. If the second panel 3 is not in the first position, the controller 75 operates in a second mode for example running a second set of software applications, which may include image capturing, video calls and e-mail.

It will be appreciated that many modifications may be made to the embodiment hereinbefore described. The second panel may slide transversely over the first panel. Panels of different sizes may be used. The upper face of the first panel need not support a user-operable input device. The lower face or sides of the first panel may support a user-operable input device.

The invention claimed is:

1. An apparatus comprising a first housing portion having a region configured to receive a user-operable input device on a first face, a second housing portion and a third housing portion, the third housing portion being hingedly coupled to the first housing portion and the second housing portion being slidably coupled to the third housing portion, the second housing portion configured for slidable movement over the first face of the first housing portion between a first position in which the region configured to receive the user-operable input device is concealed and a second position in which the region is exposed and, when the second housing portion is in the second position, for pivotal movement towards the first face of the first housing portion to a third position.

2. The apparatus according to claim 1, wherein the second housing portion substantially covers the first face of the first housing portion when in the first position.

3. The apparatus according to claim 1, wherein the region configured to receive the user-operable input device substantially covers the first face of the first housing portion.

4. The apparatus according to claim 1, wherein the user-operable input device comprises a keypad.

5. The apparatus according to claim 1, wherein the second housing portion has a region configured to receive a display device on a face relatively far from the first housing portion when the second housing portion is in the first position.

6. The apparatus according to claim 5, wherein the region configured to receive the display device substantially covers the far face of the second housing portion.

7. The apparatus according to claim 5, wherein the display device is a touch screen.

8. The apparatus according to claim 1, wherein the first and second housing portions are elongate and the second housing portion is configured for longitudinal linear movement over the first housing portion such that a first end of the second housing portion is slidable from a first end of the first housing portion towards a second end of the first housing portion.

9. The apparatus according to claim 1, wherein the third housing portion is disposed outside the first housing portion.

10. The apparatus according to claim 1, wherein the third housing portion has a body portion having a face.

11. The apparatus according to claim 10, wherein the face of the body portion has a region configured to receive an image capture device.

12. The apparatus according to claim 10, wherein the third housing portion comprises a pair of arm members disposed either side of the body portion, the arm members extending towards and either side of the first housing portion, each arm member at their distal ends on inwardly facing sides being pivotally attached to respective outwardly facing sides of the first housing portion proximately to one end of the first housing portion for tilting the third housing portion towards the first face of the first housing portion.

13. The apparatus according to claim 12, further comprising a pair of linear bearings for guiding slidable movement of the second housing portion between the arm members, each linear bearing comprising first and second bearing portions, wherein inwardly facing sides of the arm members support the first linear bearing portions and outwardly facing sides of the second housing portion support the second linear bearing portions.

14. The apparatus according to claim 1, wherein the first housing portion has first and second ends and the second housing portion has first and second ends such that a first end of the second housing portion is slidable from the first end of the first housing portion towards the second end of the first housing portion, wherein an axis about which the second housing portion pivots is proximate to the second end of the first housing portion, and wherein, when the second housing portion is in the first position, the first end of the second housing portion is located proximate to the first end of the first housing portion and, when the second housing portion is in the second position, the first end of the second housing portion is located such that, when the second housing portion is tilted, the first end of the second housing portion clears the second end of the first housing portion.

15. The apparatus according to claim 1, wherein the first and second housing portion are panels.

16. The apparatus according to claim 1, comprising a first biasing mechanism for biasing the second housing portion from the first position to the second position.

17. The apparatus according to claim 16, wherein the first biasing mechanism includes a buckling spring.

18. The apparatus according to claim 1, comprising a second biasing mechanism for biasing the second housing portion to the third position.

19. The apparatus according to claim 18, wherein the second biasing mechanism includes a torsional spring.

20. The apparatus according to claim 1, configured to be operable as a housing for a portable electronic device.

21. The apparatus according to claim 1, wherein the second housing portion is configured to have a fixed orientation relative to the third housing portion.

22. An apparatus comprising a first housing portion supporting a user-operable input device on a first face, a second housing portion and a third housing portion, the third housing portion being hingedly coupled to the first housing portion and the second housing portion being slidably coupled to the third housing portion, the second housing portion configured for slidable movement over the first face of the first housing portion between a first position in which the user-operable input device is concealed and a second position in which the user-operable input device is exposed and, when the second housing portion is in the second position, for pivotal movement towards the first face of the first housing portion.

23. The apparatus according to claim 22, further comprising a processor responsive, when the second housing portion is in the first position, to operate in a first mode and, when the second housing portion is in the second position, to operate in a second, different mode.

24. The apparatus according to claim 22, operable as a mobile communications device.

25. The apparatus according to claim 22, operable as a handheld computing device.

26. The apparatus according to claim 22, wherein the third housing portion is disposed outside the first housing portion.

27. The apparatus according to claim 22, configured to be operable as a portable electronic device.

28. An apparatus comprising:
means for supporting a user-operable input device on a first face of said means for supporting,
means for hingedly coupling to the means for supporting,
means for slidable movement over the first face of the means for supporting between a first position in which the user-operable input device is concealed and a second position in which the user-operable input device is exposed and, when the means for slidable movement is in the second position, for pivotal movement towards the first face of the means for supporting to a third position;
wherein said means for hingedly coupling to the means for supporting is also for hingedly coupling to said means for slidable movement.

* * * * *